United States Patent [19]
Triggiani

[11] 3,904,736
[45] Sept. 9, 1975

[54] PREPARING MICROSPHERES OF ACTINIDE NITRIDES FROM CARBON CONTAINING OXIDE SOLS
[75] Inventor: Leonard V. Triggiani, Hyattsville, Md.
[73] Assignee: W. R. Grace & Co., New York, N.Y.
[22] Filed: June 1, 1966
[21] Appl. No.: 554,345

[52] U.S. Cl. .......... 423/251; 252/301.1 S; 423/252; 423/253; 423/254
[51] Int. Cl. ...................... C01g 56/00; C01f 15/00
[58] Field of Search .................. 23/347, 343–345; 252/301.1; 423/253, 254, 249, 251, 252

[56] References Cited
UNITED STATES PATENTS
3,213,032  10/1965  Hammond .................. 23/347 X
3,228,748  1/1966  Accary et al. .................. 23/347

OTHER PUBLICATIONS
AECD, ORNL-3897, (Nov. 1965), pgs. 1, 6–9, 11, 13, 16, 21, 22, and 24.
Nuclear Science Abstracts, Vol. 17, No. 11, June 15, 1963, Pages 2449, 2450, Abstract No. 18765.
Nuclear Science Abstracts, Vol. 18, No. 2, Jan. 31, 1964, Page 312, Abstract No. 2165.

Primary Examiner—Benjamin R. Padgett
Assistant Examiner—E. A. Miller
Attorney, Agent, or Firm—Joseph P. Nigon

[57] ABSTRACT

A process for preparing uranium nitride, uranium oxynitride and uranium carboxynitride microspheres and the microspheres as compositions of matter. The microspheres are prepared from carbide sols by reduction and nitriding steps.

18 Claims, No Drawings

PREPARING MICROSPHERES OF ACTINIDE NITRIDES FROM CARBON CONTAINING OXIDE SOLS

Our invention relates to nitride and carbonitride compositions for use in nuclear reactors. It also relates to a process for converting oxides and carbides to their respective nitrides or carbonitrides or oxynitrides by careful selection of reactant ratios and of sintering techniques.

In one specific embodiment, it relates to actinide nitride materials and to actinide nitrides and carbonitrides diluted with certain additive nitrides and carbonitrides; and more particularly, to these materials in the form of powders and spherical particles.

In another embodiment, it relates to making such nitrides, carbonitrides and oxynitrides from colloidal residues.

In still another embodiment, it relates to a novel method for converting actinide oxides-carbides to the nitride or carbonitride by the careful selection of reactant ratios and of sintering techniques.

Of the actinide nitrides, the most interest is in uranium nitride. There are three nitrides of uranium. The mononitride, UN, the dinitride, $UN_2$ and the sesquinitride, $U_2N_3$. The most stable modification and the one of greatest interest for nuclear applications is the mononitride, UN. The prior art process for preparing the mononitride is by direct heating of the elements, using finely divided uranium powders and nitrogen, the uranium powder being in the form of a metal. Another prior technique is to react the hydride with nitrogen to form UN.

Uranium nitride is particularly advantageous as a nuclear fuel. Uranium nitride is very dense and has a high atomic percent uranium and thus gives the largest number of uranium atoms per cubic centimeter of volume of any of the practical or feasible nuclear fuels known to date. This high density gives uranium nitride great utility in applications in high power density nuclear reactors and also reactors where space is a factor and where it is desired to pack the highest density of nuclear material per unit volume. The second advantage of the material is its very high thermal conductivity by comparison with materials like the oxide and carbide. The thermal conductivity actually increases with increasing temperature above 815°C. One of the products of the present application has another special advantage in that it is prepared in the form of microspheres. The microsphere shape is particularly desirable in that it simplifies dispersion of the fuels and the ability to encapsulate them to retain fission products. Uranium nitride in the form of microspheres is also compatible with matrix materials. It is very compatible with coolants normally used in nuclear reactors and therefore the problem of stability over long periods of time is minimized.

In the operation of a nuclear power reactor economics is an important consideration. The previously described methods depend on first converting the oxide to the metal, thus introducing added cost. By contrast uranium oxides are relatively inexpensive. More recently economical methods for producing the carbides have been developed. Our invention relates to an economic method for converting the oxides and the carbides of uranium directly to the nitride.

Prior methods for producing uranium nitride have difficulty in obtaining product purity and compound stoichiometry by normal casting and sintering techniques. Our process yields materials of extremely well controlled composition and purity.

Previous techniques, employing the approach of classical ceramics to the fabrication of nitrides, require the mechanical blending of reactant powders. These powders are large in size, coarse, dense, of low surface area, and of low reactivity. Our starting materials are of colloidal dimensions and are therefore by comparison extremely small, finely divided, of low density, of high surface area, and of high reactivity. The small size of the particles, and the method of preparing the codispersion allows quantitative accuracy in preparing the ratio of reactants. Also the degree of homogeneity achieved in our colloidal residues is far beyond that possible by normal blending of ceramic powders. The closer approach of reactant particles allows completion of chemical reaction. The high reactivity of the particles permits reaction and densification at temperatures below those encountered with materials prepared by normal ceramic techniques. This obviates the high densification temperatures which may lead to disproportionation and loss of product purity in nitrides. Also sizing and shaping of the product in the case of microspheres is accomplished without the disadvantageous use of arc-melting and without the production of costly and noxious fines.

We have found that uranium dioxide sols with micelle sizes about 10 $\mu$ can be mixed in any desired proportion with any of a variety of carbon dispersions. The carbon dispersions may range from 9 $\mu$ (as in the case of Carbolac 1, a Cabot Corporation product) up to Sterling MT (another commercially available product) with a particle size of about 500 $\mu$.

By suitable choice of carbon to uranium ratio in the colloidal feed materials we can prepare uranium nitride product which is quantitatively pure and free of excess carbon or residual oxygen or alternatively, contains any desired amount of carbon in solid solution as the carbonitride.

We have found that when nitride formation proceeds at temperatures of 1500°C. and below in samples containing an excess of carbon that such carbon is present in the form of free or uncombined carbon. By treatment at temperatures in excess of 1500°C. the free carbon and uranium nitride will react to form a solid solution of the type $U(C_xN_{1-x})$.

By proper choice of carbon to uranium ratio we can also make a uranium mononitride-uranium dioxide nuclear fuel of any desired oxygen compositions. Both the carbonitride and oxynitride compositions are ideal mixtures of the two components. Because each has been made from colloidal materials, the components are intimately mixed on the micellar level. This advantage confers a degree of homogeneity and intimacy of components and phases not achievable by the blending techniques of classical ceramics. The fact that we are starting with 10 $\mu$ size micelles as reactants means that reaction and sintering may be accompanied by several orders of magnitude increase in grain size and the final product will still be in the sub-micron size range. We have found this behavior in all our colloidal residues; that is, powders as well as microspheres.

It is an object of this invention to provide a uranium nitride nuclear fuel in the form of a powder or microsphere.

It is a further object of this invention to provide a uranium nitride microsphere having a ratio of major to minor axis of 1.00.

It is also an object of this invention to provide a uranium nitride powder or microsphere of high density and extremely high purity.

It is an object of this invention to provide uranium nitride binary and ternary powders and microspheres of the composition (U—X)N and (U—X—Y)N.

It is an object of this invention to provide such powder and microsphere compositions with an extremely small grain size from colloidal residues.

Another object of this invention is to provide a process for making a uranium nitride nuclear fuel powder of irregularly shaped particles.

Another object of this invention is to provide a process for making a uranium nitride nuclear fuel shaped in the form of a microsphere.

It is also an object of this invention to provide a process for making a uranium nitride powder or microsphere of high density and extremely high purity.

It is also an object of this invention to provide a process for preparing coated uranium nitride microspheres that can withstand high temperature treatment without migration.

It is also an object of this invention to provide a process for making oxynitride and carbonitride solid solution systems by quantitative control of reactant ratios in the colloidal feed and by adjustment of reactant ratios in the first step.

It is also an object of this invention to provide a process for making multicomponent actinide nitride powders and microspheres of the type (U—X)N, (U—X—Y)N, and (X—Y)N.

It is also an object of this invention to provide a process for making such powder and microsphere compositions with extremely small grain size.

We have found that uranium nitride can be made from porous uranium carbide using a sintering technique. One novelty of our process resides in the very careful control of the carbon to uranium ratio, the kind and amount of sweep gas used in the preparation and the very careful control of the temperature throughout the preparation. The raw material for my novel process can be any of the carbide powders or microspheres. Carbide microspheres can be prepared using a conventional swaging technique which involves a preparation of the carbide, followed by screening and abrasion techniques.

One suitable raw material for the preparation of the uranium nitrides according to my novel process has been disclosed previously. Very briefly, this process consists of the preparation of mixed actinide metal oxide-carbon sols and the preparation of a colloidal residue to obtain the dried microsphere or powder.

The dried uranium dioxide-carbon residue (microsphere or powder) is highly porous. In the case of microspheres, this property allows reactants to flow in and products to flow out of the microsphere simultaneously without disruption of the microsphere structure. In the following discussion, it is understood that our invention applies to all colloidal residues — microspheres as well as powders — and that the microsphere is chosen only for purposes of providing an example of the invention.

The carbide microsphere is obtained by sintering to form porous carbide microspheres. The colloidal microsphere of uranium dioxide plus carbon reacts to completion at very low temperatures; that is, temperatures which do not densify the microsphere. Thus, we form a microsphere of high carbide purity and low density — a combination not achievable by methods requiring high temperature and melting for reaction to completion and spheroidization. The porous microsphere now allows the nitriding gas access to the interior and product gases to escape. Again, the reactivity of the particles permits this to occur at low temperatures where higher nitride formation and premature densification do not occur. The nitride microsphere may then be heated to a higher temperature for a short period of time for final densification. The process comprises preparing a colloidal carbon system in which fine sized carbon is dispersed in a small volume of water. This dispersion can be prepared using an ultrasonic probe, but other conventional dispersion techniques and dispersing agents may also be used.

In the next step of the process, the carbon dispersion is added to the actinide oxide aquasols such as are described in U.S. Pat. No. 3,097,175. The two sols are mixed in the presence of dispersing agents and are dehydrated in a column using the techniques described in detail in another application. The mixed carbonoxide microsphere is then ready for use as a feed to the process of the instant application.

The aquasols of zirconia, alumina, tantala, titania, niobia, yttria, beryllia, magnesia, silica, vanadia, tungsta; actinide oxides such as urania, thoria, plutonia, and mixtures thereof; rare earth oxides such as ceria, ytterbia, gadolinia, etc.; mixed sols prepared from mixtures of actinide oxides with rare earths, zirconia, etc., may be used to prepare the green spheres that are used in our novel process.

For purposes of simplicity, the process will be described using urania and carbon, although it is understood that our process is not limited thereto.

In this particular modification, a urania-carbon green sphere is prepared from urania and carbon with careful adjustment of the carbon to urania ratio so that there is just enough carbon available to remove the oxygen from the green sphere. This result is achieved if the carbon to uranium ratio is maintained at 2.2 to 2.4. We have also found that compositions having the formulae UNO and UNOC can be prepared by careful control of the sintering cycle and the carbon to uranium ratios. If the carbon to uranium ratio is maintained above about 2.4 excess carbon is present and the product recovered has the empirical formula UNOC. When the carbon to urania ratio is decreased to about 2.1 or lower the product recovered has the empirical formula UNO.

In actual practice, we find that the amount of hyperstoichiometric oxygen available in the urania is variable. The equation for the oxygen removal would therefore more properly be written in the form

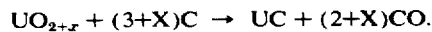
$$UO_{2+x} + (3+X)C \rightarrow UC + (2+X)CO.$$

It would be extremely problematic from the process control point of view to try to match the amount of available carbon with a variable oxygen content. The first step in our process, therefore, is an adjustment of the oxygen-uranium ratio.

In our process the excess oxygen is removed by heating the sample in a hydrogen atmosphere. The temperature is raised to 400°–600°C. over a period of about 1 hour and held at this level for about 3 hours. The porosity of the colloidal residue permits diffusion of the reactant gas into the innermost portions of the sphere and also allows outward diffusion of the product gas with no disruption of the particle shape or physical integrity.

Carbide formation takes place by sintering the spheres at temperatures in the range of 1400° to 1500°C. This is done in an inert gas such as argon, for example, in the proper temperature range to form the carbide. At this temperature range, the porosity of the green sphere is maintained. Very little, if any, densification takes place.

In the next step of my process, the argon atmosphere is bled from the system and a nitrogen atmosphere introduced. The nitrogen reacts with the uranium carbide which is still highly porous to displace the carbon and form the mononitride. Considerable densification of the mononitride takes place at this stage. Densification, as much as 80%, is achieved by the end of the nitride formation. Should an excess of unreacted carbon be present at this stage the remaining porosity may be used to advantage to remove the impurity. We may simply introduce hydrogen or carbon dioxide into the gas stream to act as a scavenger for the excess carbon. The reactant gas will diffuse into the microsphere and the product gas will diffuse out of the microsphere.

The porosity and method of purification of the microspheres are novel features of our invention. The purified mononitride is then heated in an inert atmosphere, such as an atmosphere of argon or helium, to temperatures of greater than 1500°C. to achieve the final density. At very high temperatures the nitride may have some tendency to disproportionate. This tendency may be counter-balanced by introducing a slight amount of nitrogen into the inert atmosphere. Normally, however, we have found that our colloidally prepared materials can be densified at sufficiently low temperatures and over sufficiently short time periods that nitrogen is not lost in the process.

When the process is completed, the furnace is cooled in the presence of the sweep gas and the nitride spheres recovered. It is possible to prepare spheres of greater than 90 percent of theoretical density using our novel process.

The critical features in the process reside in the careful selection and control of the sweep gas in the early carbide formation stage and careful control of temperatures. The sweep gas in the carbide formation stage can be any inert gas such as argon, helium, etc. In a typical run, for example, with about 50 grams of $UO_2+C$ the gas is maintained in the range of one to five liters per minute of argon, preferably about 3 to 4 liters per minute. The temperature during the carbide formation stage is kept in the range of 1100°C. to 1800°C., preferably 1400°C. to 1500°C. for 10 to 30 hours.

In the next step of the process, the porous carbide spheres are converted to the nitride or mixtures of the nitride and carbon by changing the atmosphere to nitrogen. Any commercially available grade of nitrogen gas can be used in our novel process. In a typical 50 gram sample the nitrogen gas is swept through the system at the rate of 5 to 10 liters per minute. The limiting factor on the temperature and times in our novel process resides in the maintenance of a temperature high enough for the formation of dense spheres over an appropriate period of time. The reaction is normally carried out at temperatures of 1450° to 1800°C. for 6 to 10 hours; however, it can be carried out at temperatures as high as 1850°C. for 1 to 1½ hours without encountering problems with interparticle sintering or agglomeration.

By adjusting the carbon to uranium ratio, it is possible to make any mixture of nitride and uranium carbide from the pure uranium nitride to the pure uranium carbide. There is considerable interest in the literature in carbonitrides of this sort and our novel process provides a method of preparing carbonitrides that have any desired composition. Our process is further illustrated by the following specific but non-limiting examples.

EXAMPLE I

This example illustrates one method of preparing a porous carbide green sphere for the use as a raw material in our novel process.

A urania sol containing colloidal carbon was obtained by mixing a urania sol containing 10 weight percent uranium with a carbon sol containing 15 weight percent carbon. The final sol contained 9 weight percent $UO_2$ and 1.1 weight percent carbon. An electronmicrograph of the urania sol showed dense particles of about 10 millimicrons in diameter. The carbon sol was prepared by dispersing Cabot's Regal SRF-S with dilute ammonia and Daxad 11. This particular carbon has a particle size of about 56 millimicrons.

The urania sol was prepared by electrodialysis of a uranyl chloride solution at 60°C. The mixed sol was dried to microspheres by settling through a counter flow column of hot hexanol of controlled temperature and water content. The water was exchanged to the solvent and removed from the solvent in a second distillation step. The equipment used for this run was a 7 foot column, 3 inches in diameter equipped with a double valve system at the bottom for separating the dried spheres from the hexanol and for collecting the dry spheres which settled through the solvent mixture. A 50 liter three-necked distillation flask was fitted with a condenser used for water removal. The separated solvent was returned to the pot and the distillate water either discarded or controlled amounts were returned to the pot, as required to maintain a given water content by the control of distillation temperature.

The distillation pot also serves as a solvent reservoir for the system wherein the solvent was maintained at a given temperature and water content. The solvent was pumped from the distillation pot through a line with heat exchanger and water cooler to adjust the temperatures required. The solvent entered the column four inches below the bottom to provide a slow upward solvent counterflow in the column and to the exit from the column, which was four inches from the top. The solvent was returned through a flow meter to a distillation pot. In the return solvent line, there was a provision for recycle of any desired portion of this solvent flow to the column bottom.

Water was used to establish operating conditions after which the sol was substituted for water. The sol or water was injected centrally at the top of the column through a submerged needle or other device to produce droplets of controlled size dehydrated to dried spheres on passing through the column. The spheres settled and were collected in the valve system at the bottom of the column.

The urania-carbon sol was injected at the column top into the hexanol, at a temperature of 96°C. at the inlet and 60°C. at the outlet. Distillation pot temperature was maintained at 105°C. The column was operated to maintain an inlet solvent water content of about 5 to 6 weight percent. The green sphere products ranged in size from 130 to 200 microns. The spheres were air dried, set with concentrated ammonia for 20 minutes, washed for 8 hours with water to remove any residual impurities, vacuum dried and used as one of the raw materials of our novel process.

EXAMPLE II

This example illustrates the method of preparing the uranium nitrides.

Approximately 50 grams of the green uranium oxide-carbon microspheres, prepared by the technique of Example I, with a carbon to uranium molar ratio of 2.37 were transferred to each of two graphite crucibles. The crucibles were inserted in ceramic tubes inserted between the silicon carbide heating elements of a two tube Burrell furnace. In order to have some check on the first step of the process, two samples were placed in separate ceramic tubes in side by side relationship in the hot zone of the furnace. Hydrogen gas flow was started through the two tubes and the temperature was increased to 500°C. over a period of 1 hour. The temperature was maintained at 500°C. for 3 hours. The gas sweep was changed to argon and the temperature was increased to 1500°C. over a 3½ hour period and maintained at this temperature for a period of 16 hours.

At the end of this time, one of the crucibles was removed and the product characterized. The other crucible was allowed to remain in the furnace and the gas sweep was changed from argon to nitrogen. The nitrogen sweep was continued at a temperature of 1400°C. for a period of 7 hours. The temperature was then increased to 1500°C. for an additional period of 7 hours. The product was removed and analyzed. The data collected in this run are shown in the table below:

Table I

| Run | Treatment | Product and Analysis | | | |
|---|---|---|---|---|---|
| | | X-ray | Unit Cell | Free Carbon | Oxygen |
| I | argon only | UC | 4.922 A | 1.23% | 2.46% |
| II | argon followed by nitrogen | UN | 4.892 A | 0.69% | 580 ppm |

The unit cell for uranium nitride is given in the collection of x-ray data published by the American Society of Testing Materials. In this series, card No. 11315 a unit cell for uranium nitride is given at 4.890. This compares with a unit cell of 4.892 for the uranium nitride product. The product recovered in this run had a density of 81% of theoretical.

EXAMPLE III

An effort was made to increase the theoretical density and decrease the oxygen content of the UN product. The product recovered from the above run, having a density of 81% of theoretical and containing 580 parts per million of oxygen was transferred to a commercially available high temperature Abar furnace equipped with means for sweeping the gas through the furnace. The sample was brought up to a temperature of 1700°C. in an argon atmosphere. The product was analyzed and found to contain 410 parts per million of oxygen and to have a density of 90% of theoretical. It is apparent from these data that the product can be improved by continued sintering of the material in an argon atmosphere. There was no evidence of interparticle agglomeration or other undesirable properties in the product.

EXAMPLE IV

This example illustrates the importance of the carbon to uranium ratio in the green spheres used as a feed material for the process. In this run, the green spheres were prepared using the process described in Example I. The spheres have a carbon to uranium ratio of 2.78 as contrasted with a carbon to uranium ratio of 2.37 in Example II.

In this run, approximately 50 grams of the green spheres were placed in separate graphite crucibles in side to side relationship in the Burrell furnace as in Example II. The hydrogen flow was started over the spheres and the temperatures increased to 500°C. for a period of 3 hours then increased to 1400°C. under argon for a period of 13 hours and maintained at 1500°C. for 16 hours. At the end of this time, one of the tubes was removed from the furnace, the sweep gas was changed from argon to nitrogen and the temperature held at 1300°C. for 2½ hours, followed by increase to 1500°C. for 7 hours. The data collected in this run is shown in Table II.

Table II

| Treatment | Product Analysis | | | |
|---|---|---|---|---|
| | X-ray | Unit Cell | Free Carbon | Oxygen |
| Argon only | UC | 4.947 A | Not determined | Not determined |
| Argon followed by nitrogen | UN | 4.895 A | 2.26% | 0.699% |

It is apparent from these data that the carbon to uranium ratio in the green spheres is critically important. The product recovered had a unit cell of 4.895 which is only slightly different from the product of Example II. However, the free carbon content of the product and the oxygen content were substantially higher. The product had a density of 90% of theoretical.

EXAMPLE V

This example illustrates the effect of sintering temperatures. In this example, a product with a carbon to uranium ratio of 4.42 was used. In this run, approximately 50 grams of the uranium carbide green spheres were placed in separate crucibles in side by side relationship in the Burrell tube furnace using the techniques describes in Example II. The temperature was increased to 500°C. under hydrogen for 3 hours and increased to 1400°C. and held this temperature for 17 hours. Argon was swept through the furnace at a rate sufficient to remove the carbon monoxide as it was formed. At the end of 21 hours, one of the crucibles was removed and analyzed. The other crucible was allowed to remain in the furnace. The argon sweep gas was discontinued and the furnace was swept with nitrogen. The temperature was maintained at 1400°C. for a period of 10 hours with a nitrogen sweep. The products were recovered and analyzed. The data collected in this run is set out in Table III.

Table III

| Treatment | Product Analysis | | |
|---|---|---|---|
| | X-ray | Free Carbon | Oxygen |
| Argon only | UC<br>UC₂<br>trace UO₂ | 3.37% | 0.7% |
| Argon followed by nitrogen | UN<br><br>trace UO₂ | 5.31% | 0.2% |

These data show that a uranium nitride product can be recovered using green spheres with a carbon to uranium ratio as high as 4.42 as the starting material. The product was contaminated with a trace of uranium oxide and contained 0.2 weight percent oxygen. This run emphasizes the importance of the carbon to urania ratio in the green spheres used to prepare the nitride. The product microspheres can either be treated with CO and hydrogen at this stage to remove excess carbon or, alternatively, they may be treated at a higher temperature to produce a homogeneous uranium carbonitride solid solution.

Example VI

This example covers the preparation of materials analyzing UNO and UNOC. Green microspheres having a C/U ratio of 2.11 were put into the Burrell tube furnace and heated very rapidly over a one-half hour period to 1400°C in a nitrogen atmosphere. The temperature was held at 1400°C for 19 hours, then increased to 1500°C and held for 26 hours. The samples were quenched and removed from the furnace and sent for analysis. The product from this run, designated Run 1, was analyzed, the data obtained is set out in the table below.

Green microspheres having a C/U ratio of 2.11 were heated for 2½ hours at 500°C in hydrogen. The atmosphere was then switched to nitrogen, and the temperature increased to 1100°C over a 20 minute period. The temperature was then increased over a 2 hour period to 1450°C in nitrogen. The temperature was maintained at 1450°C about 24 hours in a nitrogen atmosphere. The temperature was increased to 1550°C and held there for 20 hours in the nitrogen atmosphere. The atmosphere was then switched to argon, the reactor cooled to room temperature over a period of 1.5 hours. The product from this run, identified as Run 2, was analyzed and found to have the properties set out in the table below.

Green microspheres having a C/U ratio of 2.68 were treated for 4 hours in hydrogen at 500°C. The atmosphere was switched to argon and the temperature increased to 1450°C over a 40 minute period. The temperature was held constant at 1450°C in argon for 24 hours. The temperature was then increased and held at 1500°C for 2 hours. The atmosphere was switched to nitrogen and held at 1450°C for 24 hours, then increased to 1500°C for a period of 1.5 hours. The atmosphere was then switched to argon and the sample cooled to room temperature under the argon atmosphere. The product of this run, designated Run 3, was analyzed and found to have properties set out in the table below.

A ten gram sample of green microspheres having a carbon to uranium ratio of 2.56 was placed in a Burrell tube furnace and heated at 500°C under a hydrogen atmosphere for 4 hours. The atmosphere was switched to argon and the temperature increased to 1450°C over a 1.5 hour period. The temperature was held constant at 1450°C for about 16 hours in argon. The atmosphere was then switched to nitrogen and held for 8.5° hours at 1450°C. The sample was then cooled in an argon atmosphere over a 16 hour period.

TABLE IV

| Run No. | Carbon to Urania ratio | Unit Cell | Weight percent | | | |
|---|---|---|---|---|---|---|
| | | | Carbon | Oxygen | Nitrogen | Uranium |
| I | 2.11 | 4.870 | 0.02 | 7.5 | 4.8 | 91.06 |
| II | 2.11 | 4.889 | | 5 | 5.56 | |
| III | 2.68 | | 2.31 | 3–5 | | 89.23 |

It is apparent from the data collected in Runs 1 and 2 that at a carbon to urania ratio of 2.11 the product recovered has the composition UNO. The urania content is about 91 weight percent and there are roughly equal amounts of oxygen and nitrogen in the compound. The data presented in Run 3 summarizes the preparation of the carboxynitride compound, UNOC. In this run the carbon to urania ratio was increased to 2.68. The product had a total carbon in excess of 1.50% and contained from 3–5% oxygen. From the percentage of uranium present in the compound it is obvious that there was also nitrogen present. The composition recovered in this run had the empirical formula UNOC.

EXAMPLE VII

This example describes the coating procedure for the uranium nitride microspheres.

The product recovered in Example 2, Run 2 having a free carbon content of 0.69% was coated according to the following procedure. The coating reactor used was a graphite reactor suitable for coating materials in a fluidized bed. The reactor was about 1 inch in diameter and about 12 inches in length. Gases were introduced into the bottom of the reactor in such a manner as to cause fluidization of the particles in the reactor. The graphite reactor was enclosed in a quartz envelope and insulated with small particles of a commercially available graphite (sold by the Cabot Corp.). The reactor was heated by induction coils placed external to the quartz envelope and connected to a 25 kilowatt Westinghouse generator. The particles were initially fluidized with an argon flow of 2–3 liters per minute. The temperature was brought to about 1200°C and held at 1200°C for 1 hour. The argon flow was then set at 1.4 liters per minute and methane admitted into the reactor at a rate of about 0.03 liter per minute. This represents a volume fraction of methane of about 2.1 to 2.3 volume percent. The coating was applied over a 3.5 hour period at 1200°C. The temperature was then increased to 1900°C for a 3 hour period while the volume fraction of methane was maintained at about 2.2 volume percent.

We have found that coating in the range of 1200°–1400°C and in the range of 1900°–2200°C gives the densest and most graphitic pyrolitic carbon coatings. These coatings are most desirable when the volume fraction of methane to argon is in the range of 2 to 7 volume percent.

One of the most crucial properties of the coated microsphere is that the coated particle must be stable at extremely high temperatures, that is to say, that under high temperature treatment or high temperature use in a reactor or during high temperature fabrication the core material of the particle must not migrate into the coating of the particle. We have found that by coating under these conditions migration resistant microspheres of uranium mononitride can be formed.

Without being bound by these observations we believe that these desirable properties of migration resistance are strongly dependent on the spherical shape of the uranium mononitride substrate core. None of the prior art compositions of uranium nitride were spherical and migration resistance has not been obtained with these materials. Prior art materials were usually materials with an irregular radius of curvature. It has been found that where departures from sphericity occur one is most likely to encounter migration of the core material at high temperatures.

Other prior art spherical materials previously available were made from very dense precursors and fabricators were successful only in converting the outer most edge of the microsphere to the nitride composition. These materials also encountered migration problems.

To test the migration resistance of our product we placed about one-half gram of material in a graphite crucible and heated extremely rapidly to 2300°C under argon atmosphere. Again the 25 kilowatt RF generator was used. The 2300°C was held constant for a 4 hour period. At the end of the 4 hours the material was quenched rapidly and removed from the reactor. When it had achieved room temperature the material was examined by radiographic technique and compared with material before the high temperature treatment.

The radiographic technique used involves mounting the microspheres above an x-ray sensitive photographic plate. X-rays are then passed through the microspheres in such a manner that the core material will stop the x-rays, with the carbon coating which is free of uranium permitting the passage of x-rays. The x-ray plates obtained from the material before thermal treatment revealed that the particles were entirely spherical and that no uranium was present in the coating material. The photographic plates obtained after the thermal treatment revealed that the uranium in the core was still all entirely contained in the core and that none of it had migrated into the coating material. The photographic plates obtained after thermal treatment were indistinguishable from those obtained before thermal treatment.

Obviously many modifications and variations may be made without departing from the essence and scope thereof, and only such limitations should be applied as are indicated in the appended claims.

What is claimed is:

1. A process for preparing nitrides, oxynitrides, and carboxynitrides of actinide metals and mixtures of actinide metals with other ions in microspheroidal form, which comprises:
    a. Preparing carbon containing spheres of said actinide metal from the corresponding actinide metal oxide sol wherein the carbon to actinide metal ratio is in the range of 2.2 to 2.4, less than 2.1, greater than 2.4 to about 4.4 respectively;
    b. Heating said spheres to a temperature of about 400°–600°C. in a reducing gas atmosphere to remove excess oxygen;
    c. Sintering the spheres at a temperature of about 1400° to 1500°C. in an inert atmosphere to complete carbide formation;
    d. Converting the carbide spheres to the nitride by heating in a nitrogen atmosphere;
    e. Densifying the nitride spheres by heating in an inert atmosphere, and
    f. Recovering the nitride microsphere product.

2. The process according to claim 1 wherein the product is the nitride, the actinide metal selected from the group consisting of thorium, uranium, and plutonium, and the carbon to actinide metal ratio used in preparing the carbon containing spheres is 2.2 to 2.4.

3. The process according to claim 1 wherein the oxygen removal is effected by heating the spheres in a hydrogen atmosphere at a temperature of about 400°C. to 600°C.

4. The process according to claim 1 wherein the spheres are heated to about 1100°C. to 1800°C. for 10 to 30 hours to complete carbide formation.

5. The process according to claim 1 wherein the nitride is formed from the carbide microspheres in a nitrogen atmosphere wherein the nitrogen is swept through the reactor at rate in excess of 1 liter per minute per 10 grams of carbide spheres, and the reactor is maintained at a temperature of 1450° to 1850°C.

6. The process according to claim 1 wherein the nitride is densified by heating in an atmosphere of an inert gas at a temperature of 1800° to 2000°C. for 0.1 to 1 hour.

7. The process according to claim 1 wherein the actinide metal is thorium.

8. The process according to claim 1 wherein the actinide metal is uranium.

9. The process according to claim 1 wherein the actinide metal is plutonium.

10. The process according to claim 1 wherein the product has the empirical formula XNOC wherein X is an actinide metal selected from the group consisting of thoria, urania and plutonia, and the carbon to actinide metal ratio used in preparing the spheres is above about 2.4 to about 4.4.

11. The process according to claim 1 wherein the product has the empirical formula XNO wherein X is an actinide metal selected from the group consisting of thoria, urania, and plutonia, and the actinide metal to carbon ratio used in preparing the spheres is less than about 2.1.

12. A process for converting actinide prepared from colloidal materials to nitrides which comprises:
    a. Preparing carbon containing actinide oxide microspheres by mixing carbon and actinide metal sols and drying to form microspheres;
    b. Heating said microspheres in a reducing atmosphere to remove excess oxygen;
    c. Sintering the spheres to complete carbide formation;
    d. Converting the carbide spheres to the nitride by heating in a nitrogen atmosphere;
    e. Densifying the nitride spheres by heating in an inert atmosphere and;
    f. Recovering the nitride microspheres product.

13. The process according to claim 12 wherein the actinide metal is selected from the group consisting of thoria, urania and plutonia and the carbon to actinide metal ratio used to prepare the carbon containing spheres is 2.2 to 2.4.

14. A process for preparing nitrides, oxynitrides, and carboxynitrides of actinide metals and actinide metals with other ions which comprises:
  a. Preparing carbon containing colloidal residues of said actinide metal oxide from the corresponding actinide oxide sol, wherein the carbon to actinide metal ratio is 2.2 to 2.4, less than 2.1 and 2.4 to about 4.4 respectively,
  b. Preparing spheres of said residues,
  c. Heating said residue in a reducing gas atmosphere to remove excess oxygen,
  d. Sintering the residues to complete carbide formation,
  e. Converting the carbide residues to the nitrides by heating in a nitrogen atmosphere,
  f. Densifying the nitride residues by heating in an inert atmosphere, and
  g. Recovering the nitride product.

15. The process according to claim 14 wherein the product is the nitride, the actinide metal oxide is selected from the group consisting of oxides of thorium, uranium, and plutonium and the carbon to actinide metal ratio is 2.2 to 2.4.

16. The process according to claim 14 wherein the oxygen removal is effected by heating the residues in a hydrogen atmosphere of a temperature of about 400° to 600°C, carbide formation is completed by heating the residues to 1100° to 1300°C for about 10 to 30 hours and the nitride is formed in a nitrogen atmosphere at a temperature of 1450° to 1850°C.

17. A process for preparing crystalline microspheres consisting essentially of actinide mononitride comprising:
  1. Preparing carbon containing actinide oxide microspheres having a carbon to actinide metal ratio of about 2.3 to 1 by mixing carbon and actinide metal oxide sols and drying to form microspheres;
  2. Heating the spheres in an argon atmosphere at an elevated temperature to form the actinide carbide;
  3. And thereafter heating the resulting carbide in a nitrogen atmosphere at a temperature of about 1500°C to form said actinide mononitride microspheres.

18. A process for preparing crystalline microspheres consisting essentially of actinide mononitride comprising:
  a. preparing carbon containing actinide oxide microspheres having a carbon to actinide metal ratio of about 2.3 to 1 by mixing carbon and actinide metal oxide sols and drying to form microspheres;
  b. heating the spheres in an argon atmosphere at an elevated temperature to form the actinide carbide;
  c. and thereafter heating the resulting carbide in a nitrogen atmosphere at an elevated temperature at which said carbide is readily converted to said actinide mononitride microspheres.

* * * * *